United States Patent
Hu et al.

(10) Patent No.: US 9,189,232 B2
(45) Date of Patent: Nov. 17, 2015

(54) RISC PROCESSOR AND ITS REGISTER FLAG BIT PROCESSING METHOD

(75) Inventors: Weiwu Hu, Haidian District (CN);
Xiaoyu Li, Haidian District (CN);
Guojie Li, Haidian District (CN)

(73) Assignee: LOONGSON TECHNOLOGY CORPORATION LIMITED, Beijing (CN)

( * ) Notice: Subject to any disclaimer, the term of this patent is extended or adjusted under 35 U.S.C. 154(b) by 793 days.

(21) Appl. No.: 12/747,018

(22) PCT Filed: Nov. 24, 2008

(86) PCT No.: PCT/CN2008/001906
§ 371 (c)(1),
(2), (4) Date: Jun. 9, 2010

(87) PCT Pub. No.: WO2009/086727
PCT Pub. Date: Jul. 16, 2009

(65) Prior Publication Data
US 2010/0268916 A1    Oct. 21, 2010

(30) Foreign Application Priority Data
Dec. 29, 2007   (CN) .......................... 2007 1 0308571

(51) Int. Cl.
*G06F 9/30* (2006.01)
(52) U.S. Cl.
CPC ........ *G06F 9/30094* (2013.01); *G06F 9/30076* (2013.01); *G06F 9/30174* (2013.01)
(58) Field of Classification Search
CPC ............ G06F 9/30076; G06F 9/30094; G06F 9/30174

USPC ......................................... 712/220, 223, 224
See application file for complete search history.

(56) References Cited

U.S. PATENT DOCUMENTS

| | | | | |
|---|---|---|---|---|
| 4,992,934 A | * | 2/1991 | Portanova et al. | 712/209 |
| 5,077,657 A | * | 12/1991 | Cooper et al. | 703/26 |
| 5,313,644 A | * | 5/1994 | Matsuo et al. | 712/228 |
| 5,463,778 A | * | 10/1995 | Johnson | 712/229 |
| 5,481,684 A | * | 1/1996 | Richter et al. | 712/212 |
| 5,481,693 A | * | 1/1996 | Blomgren et al. | 712/225 |
| 5,574,927 A | * | 11/1996 | Scantlin | 712/41 |
| 5,664,159 A | * | 9/1997 | Richter et al. | 703/23 |

(Continued)

OTHER PUBLICATIONS

Tanenbaum, Andrew S., "Strutured Computer Organization", Prentice-Hall, Inc., Second Edition, ©1984, pp. 10-12.*

*Primary Examiner* — Benjamin Geib
(74) *Attorney, Agent, or Firm* — Cesari and McKenna, LLP; James A. Blanchette

(57) ABSTRACT

The present invention discloses a RISC processor and a method of processing flag bits of a register in the RISC processor. Said RISC processor comprises a physical register stack, an operating component connected to the physical register stack and an decoder connected to the operating component; the physical register stack comprises an emulation flag register for emulating to realize flag bits of a flag register in a CISC processor; the operating component comprises a flag read-write module for reading and writing the values of the flag bits of the emulation flag register. The operating component further comprises an operating controller for performing an operation control according to the values of the flag bits of the emulation flag register when the RISC processor is in the working mode of X86 virtual machine during an operation process.

16 Claims, 4 Drawing Sheets

(56) References Cited

U.S. PATENT DOCUMENTS

| | | | |
|---|---|---|---|
| 5,685,009 A * | 11/1997 | Blomgren et al. | 712/23 |
| 5,781,750 A * | 7/1998 | Blomgren et al. | 712/209 |
| 5,796,973 A | 8/1998 | Witt et al. | |
| 5,805,918 A * | 9/1998 | Blomgren et al. | 712/43 |
| 5,884,057 A * | 3/1999 | Blomgren et al. | 712/204 |
| 6,055,624 A | 4/2000 | Webb et al. | |
| 6,076,155 A * | 6/2000 | Blomgren et al. | 712/225 |
| 6,807,625 B1 * | 10/2004 | Knebel et al. | 712/221 |
| 7,793,270 B2 * | 9/2010 | Sandham et al. | 717/134 |
| 2003/0149963 A1 * | 8/2003 | Sandham et al. | 717/138 |
| 2005/0262330 A1 | 11/2005 | Col et al. | |
| 2007/0101073 A1 * | 5/2007 | Macri et al. | 711/154 |

* cited by examiner

| 31 26 | 25 21 | 20 16 | 15 14 13 | 6 5 | 0 |
|---|---|---|---|---|---|
| SPECIAL2 011100 | rs | 0 00000 | op 00 | Mask | FlagOp 110100 |
| 6 | 5 | 5 | 2 | 8 | 6 |

Fig.4

| 31 26 | 25 21 | 20 16 | 15 14 13 | 6 5 | 0 |
|---|---|---|---|---|---|
| SPECIAL2 011100 | 0 00000 | rt | op 01 | Mask | FlagOp 110100 |
| 6 | 5 | 5 | 2 | 8 | 6 |

Fig.5

RISC PROCESSOR AND ITS REGISTER FLAG BIT PROCESSING METHOD

CROSS-REFERENCE TO RELATED APPLICATIONS

This application is the National Stage of International Application No. PCT/CN2008/001906, filed on Nov. 24, 2008, which claims the priority of Chinese Patent Application No. 200710308571.1, filed on Dec. 29, 2007. The contents of all applications are hereby incorporated by reference in their entirety.

FIELD OF THE INVENTION

The present invention relates to a technical field of computer processors, and in particular, to a reduced instruction set computing (RISC) processor and a method of processing its register flag bit.

BACKGROUND ART

Virtual machine is a concept put forward and put into practice by IBM Corporation in the 60's of the 20$^{th}$ century, when mainframes were the mainstream computers. A mainframe was divided into multiple virtual machines and virtual machine monitors (VMMs) were used for compartmentation so that a variety of applications or a plurality of users could share this scarce resource.

However, with the reduction of cost in hardware and the enhancement of computing capabilities as well as the emergence of a multi-task operating system (OS), VMMs gradually step down from the stage of history, while microcomputers and personal computers (PCs) are becoming increasingly popular.

Nevertheless, as virtual machines are powerful and successful in that users may access to and use those functions and equipment that can be formed simply through a combination of instruction sets. In recent years, virtual machine monitors have once again become a focus in the academic circle and industry circle. Virtual machine monitors provide a virtual solution for the limitation of the modern computer system architecture, making it a powerful tool which will greatly enhance the capacity of modern computer systems.

Today's complex instruction set computing (CISC) processor architecture, such as the X86 instruction set-based CISC processor architecture, holds a dominant position in many applications, i.e., the X86 instruction set-based CISC processor architecture is used in many large-sized server-based service applications. In order to enable server-based service applications to be widely run on a reduced instruction set computing (RISC) architecture-based microprocessor, it has been a necessary task to realize its compatibility with CISC processors. In addition, in the existing CISC processor-based computers, the applications are more diverse and plenty of commercial software is based on the CISC processor. So, in order to run a wider range of diverse applications on a RISC microprocessor, it's also very urgent to realize the compatibility of the RISC microprocessor with the CISC processor.

As a major branch of RISC processors, the MIPS instruction set-based RISC processor currently has many open-source virtual machine platforms capable of realizing a heterogeneous support from the MIPS instruction set-based RISC processor to an X86 instruction set-based CISC processor.

Many aspects need be taken into account if a virtual machine is used to make an X86 instruction set-based CISC processor compatible with an MIPS instruction set-based RISC processor. One aspect is the use of flag bits of the EFLAGES in the X86 instruction set-based CISC processor.

The flag register (EFLAGS) in the X86 instruction set mainly includes the following three parts of contents:

1. status Flags, including a total of 6 bits, which are CF (carry flag), PF (parity flag), AF (auxiliary flag), ZF (zero flag), SF (sign flag) and OF (overflow flag);
2. DF (direction flag) for controlling the direction of a string operation instruction; and
3. other system flags and I/O privilege level (IOPL), including single-step mode flag, interrupt enable, I/O priority and so on, which cannot be modified by a user program.

The fixed-point operating instruction of the X86 instruction set supports the operation of a total of 6 bits (CF bit, PF bit, AF bit, ZF bit, SF bit and OF bit) of the flag bits of a flag register (EFLAGS). That is to say, in addition to data values, many operating instructions will also generate flag bits of a flag register, thereby enabling some transfer instructions to use the flag bits as a transfer condition to realize an instruction jump.

However, in the RISC processor-based X86 virtual machine in the prior art, the operation of 6-bit flag bits of a flag register is performed via simulation, which will be a considerable overhead and cause a great impact on the performance.

SUMMARY OF THE INVENTION

The problem to be solved by the present invention is to provide a RISC processor and a method of processing its register flag bit, which perform the operation of 6-bit flag bits of a flag register, realize the compatibility with the X86 instruction set and improve the performance of the virtual machine.

The RISC processor provided for carrying out the present invention comprises a physical register stack, an operating component connected to the physical register stack and a decoder connected to the operating component; the physical register stack comprises an emulation flag register for emulating to realize flag bits of a flag register in a CISC processor; the operating component comprises a flag read-write module for reading and writing the values of the flag bits of the emulation flag register.

The decoder comprises a mode identification module for identifying that the operation is in the working mode of emulating EFLAGS, and then decoding the emulation flag register into a source register and/or a destination register according to different instructions.

The operating component further comprises an operating controller for implementing an operation control according to the values of the flag bits of the emulation flag register when the RISC processor is in the working mode of the X86 virtual machine during an operation process.

The flag read-write module comprises a flag extraction module and a flag modification module, wherein:
the flag extraction module is used for extracting the values of one or more flag bits of the emulation flag register, controlling the extraction of one or more bits of the emulation flag register according to an 8-bit mask value in the instruction, and storing the extracted values of the flag bits of the emulation flag register in the destination register; and
the flag modification module is used for modifying the values of one or more flag bits the emulation flag register, controlling the modification of one or more bits of the emulation flag register according to an 8-bit mask value in the instruction, and modifying the emulation flag register using the values in the source register;

the operation control comprises obtaining a new flag bit of the emulation flag register according to the operation result and executing a branch jump instruction according to one or more flag bits of the emulation flag register; and the low 6 bits of the emulation flag register represent CF bit, PF bit, AF bit, ZF bit, SF bit and OF bit, respectively, from low to high.

To achieve the object of the present invention, a method of processing flag bits of a register in a RISC processor is also provided. Said RISC processor comprises a physical register stack, an operating component connected to the physical register stack and an decoder connected to the operating component; the physical register stack comprises an emulation flag register for emulating to realize flag bits of a flag register in a CISC processor; the operating component comprises a flag read-write module for reading and writing the values of the flag bits of the emulation flag register. Said method comprises the following steps:

step A: setting a working mode of an RISC processor-based X86 virtual machine in an RISC processor, namely, setting an emulation flag register available in an RISC processor; and step B: reading and writing values of flag bits of the emulation flag register and/or performing an operation control according to the values of the flag bits of the emulation flag register when the RISC processor is in the working mode of an RISC processor-based X86 virtual machine during an operation process.

Between steps A and B, the following step is comprised:

the decoder identifies that the operation is in the working mode of emulating EFLAGS, then decodes an emulation flag register into a source register and/or a destination register according to different instructions.

The step B comprises the following steps:

step B1: when the RISC processor is in the working mode of an RISC processor-based X86 virtual machine, extracting the values of one or more flag bits the emulation flag register, controlling the extraction of one or more bits of the emulation flag register according to an 8-bit mask value therein, and storing the extracted values of the flag bits of the emulation flag register in the destination register; and step B2: when the RISC processor is in the working mode of an RISC processor-based X86 virtual machine, modifying the values of one or more flag bits the emulation flag register, controlling the modification of one or more bits of the emulation flag register according to an 8-bit mask value therein, and modifying the emulation flag register using the values in the source register.

In step B: the operation control comprises the following steps:

step B1': obtaining flag bits of the emulation flag register according to the operation result; and step B2': executing a branch jump instruction according to one or more flag bits of the emulation flag register.

The low 6 bits of the emulation flag register represent CF bit, PF bit, AF bit, ZF bit, SF bit and OF bit, respectively, from low to high.

BRIEF DESCRIPTION OF THE DRAWINGS

FIG. 4 is a schematic diagram showing the code of the SETFLAG instruction for identifying emulation flag register according to an embodiment of the present invention;

FIG. 5 is a schematic diagram showing the code of the instruction MTFLAG for modifying the flag bits of the emulation flag register according to an embodiments of the present invention;

THE BEST WAY TO CARRY OUT THE PRESENT INVENTION

In order to make the object, technical solution and advantages of the present invention more clear, an RISC processor and a method of processing its register flag bit according to the present invention are further explained in detail with reference to the accompanying drawings and examples. It should be understood that the embodiments described here are used only to explain this invention, rather than limit it.

The embodiments describe the present invention by taking a MIPS64 instruction set-based RISC processor device as an example. However, it should be noted that they are not used to limit the present invention, and the present invention is also applicable to RISC processors based on other instruction sets.

Figure 1:
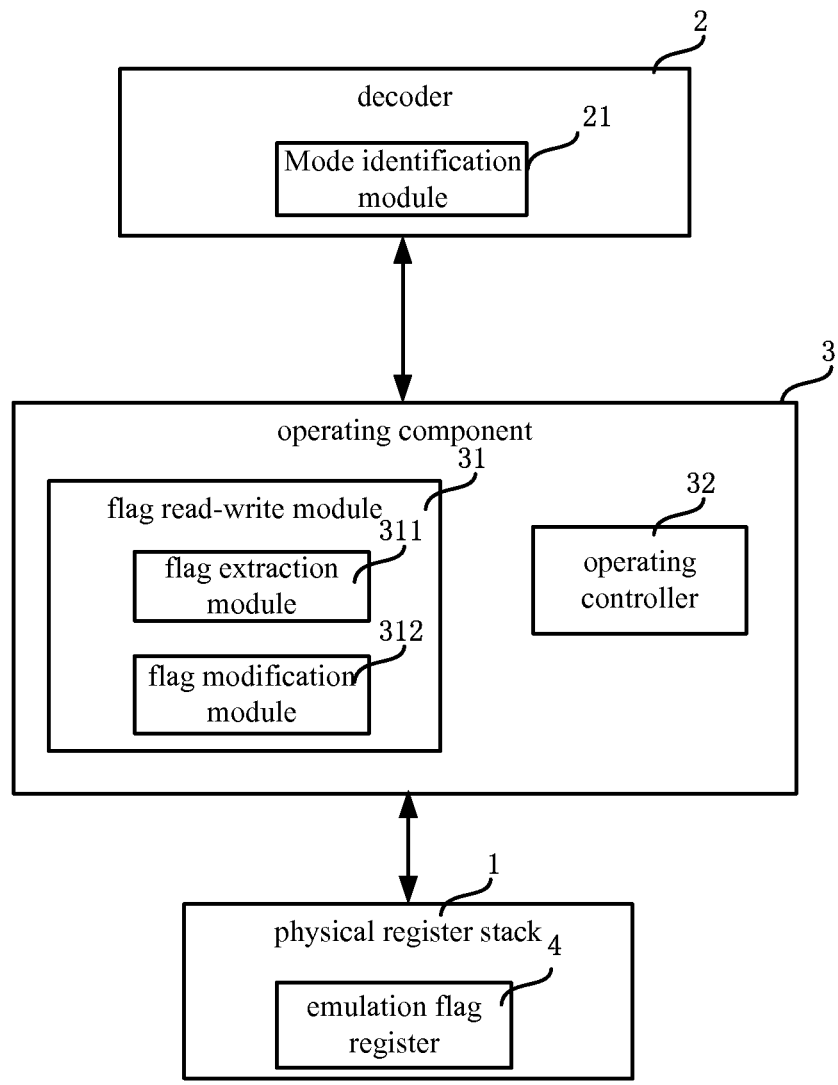
FIG. 1 is a schematic diagram of the structure of an RISC processor according to the present invention.

As shown in FIG. 1, in order to carry out the present invention, an RISC processor, which comprises a physical register stack 1, an operating component 3 connected to the physical register stack 1 and an decoder 2 connected to the operating component 3, is provided.

Figures 2, 3:
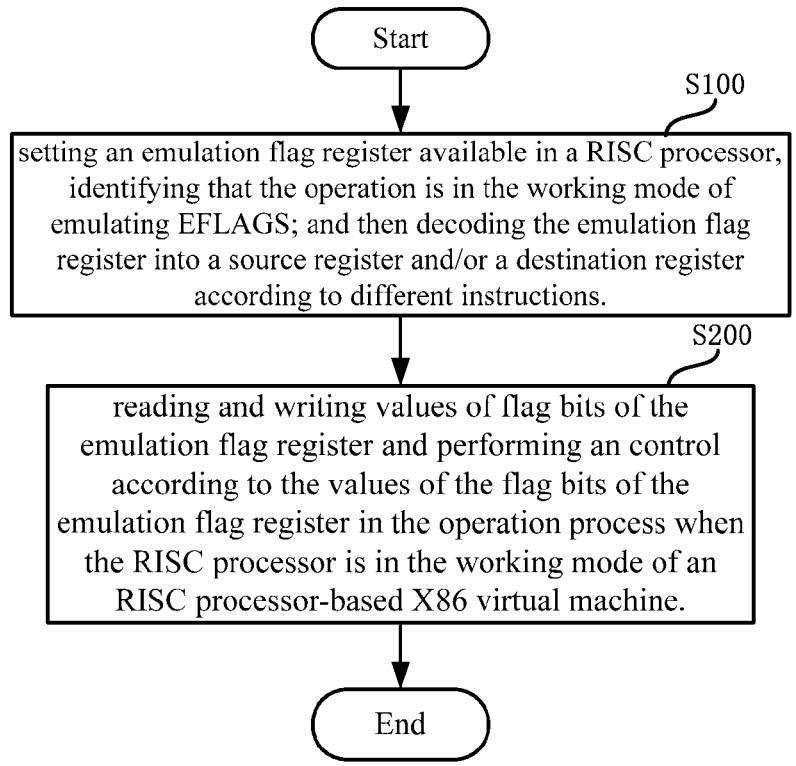
FIG. 2 is a schematic diagram of an emulation flag bit register according to the present invention.
FIG. 3 is a flow chart of a method of processing the flag bits of a register in an RISC processor according to the present invention.

The physical register stack comprises an emulation flag register 4 (M-EFLAGS) for emulating to realize flag bits of a flag register (EFLAGS) in an X86 instruction set-based CISC processor. As shown in FIG. 2, the low 6 bits of said register represent CF bit, PF bit, AF bit, ZF bit, SF bit and OF bit, respectively, from low to high, Wherein:

OF indicates that if the result overflows, it will be set to 1, or cleared;

SF indicates the highest bit of the stored results;

ZF indicates that if the result is 0, it will be set to 1, or cleared;

AF indicates that if the third bit has a carry or borrow to the fourth bit, it will be set to 1, or cleared;

PF indicates that if there is an even number of 1 in the lowest bytes, it will be set to 1, or cleared; and CF indicates that if the highest bit has a carry or borrow to the higher bit in the operation, it will be set to 1, or cleared.

The decoder 2 comprises a mode identification module 21 for identifying that the operation is in the working mode of an RISC processor-based X86 virtual machine, i.e., in the working mode of emulating EFLAGS, and then decoding the emulation flag register into a source register and/or a destination register according to different instructions.

The operating component 3 comprises a flag read-write module 31 for reading and writing values of flag bits of the emulation flag register 4.

The flag read-write module 31 comprises a flag extraction module 311 and a flag modification module 312, wherein
- the flag extraction module 311 is used for extracting the values of one or more flag bits of the emulation flag register 4, controlling the extraction of one or more bits of the emulation flag register 4 according to an 8-bit mask value therein, and storing the extracted values of the flag bits of the emulation flag register 4 in the destination register; and
- the flag modification module 312 is used for modifying the values of one or more flag bits of the emulation flag register 4, controlling the modification of one or more bits of the emulation flag register 4 according to an 8-bit mask value therein, and modifying the emulation flag register 4 using the values in the source register.

The operating component 3 also comprises an operating controller 32 for performing an operation control according to the values of the flag bits of the emulation flag register 4 when RISC processor is in the working mode of an RISC processor-based X86 virtual machine during an operation process.

The operation control comprises: obtaining a new flag bit of the emulation flag register 4 (M-EFALGS) according to the operation result; and executing a branch jump instruction according to one or more flag bits of the emulation flag register 4 (M-EFALGS).

A method of processing flag bits of a register in an RISC processor according to the present invention is explained in detail as follows: said RISC processor comprises a physical register stack 1, an operating component 3 connected to the physical register stack 1 and an decoder 2 connected to the operating component 3; the physical register stack 1 comprises an emulation flag register 4 for emulating to realize flag bits of a flag register in a CISC processor; and the operating component 3 comprises a flag read-write module 31 for reading and writing the values of the flag bits of the emulation flag register 4. As shown in FIG. 3, said method comprises the following steps:

Step S100: setting a working mode of an RISC processor-based X86 virtual machine in a RISC processor, namely, setting an emulation flag register available; identifying by the decoder that the operation is in the working mode of an RISC processor-based X86 virtual machine, namely, in the working mode of emulating EFALGS; and then decoding the emulation flag register into a source register and/or a destination register according to different instructions;
- the emulation flag register 4 (M-EFLAGS) emulates to realize flag bits of an X86 instruction set based flag register (EFLAGS), the low 6 bits of said register representing CF bit, PF bit, AF bit, ZF bit, SF bit and OF bit, respectively, from low to high.

Wherein:
OF indicates that if the result overflows, it will be set to 1, or cleared;

SF indicates the highest bit of the stored results;

ZF indicates that if the result is 0, it will be set to 1, or cleared;

AF indicates that if the third bit has a carry or borrow to the fourth bit, it will be set to 1, or cleared;

PF indicates that if there is an even number of 1 in the lowest bytes, it will be set to 1, or cleared; and CF indicates that if the highest bit has a carry or borrow to the higher bit in the operation, it will be set to 1, or cleared.

When the emulation flag register 4 is available, said operation is identified to be in a working mode of an RISC processor-based X86 virtual machine, namely, in the working mode of emulating EFALGS, the values of the corresponding emulation flag register 4 are modified according to the execution result, and then the emulation flag register is decoded into a source register and/or a destination register according to different instructions, but the result may not be stored in the original destination register.

As an embodiment, when an instruction related to the emulation flag register 4 is modifying the flag bits of the emulation flag register 4, before said instruction there is a prefix instruction SETFLAG which indicates that said instruction is in the working mode of an RISC processor-based X86 virtual machine, denoting that the sequent instruction is in the working mode of X86 virtual machine.

The instruction format is: SETFLAG/a prefix instruction of the working mode of emulating EFALGS.

It denotes that an instruction subsequent to said instruction is in the working mode of emulating EFLAGS.

The code thereof is shown in FIG. 4.

Then, when it is being executed, only the values of the flag bits of the corresponding emulation flag register 4 are modified according to the execution result, while the result is not stored in the destination register. The following is an example:

A normal MIPS instruction is
ADD $5,$1,$2,
which indicates that the result of the value of No. 1 general register plus the value of No. 2 general register is stored in No. 5 general register;
SETFLAG
ADD $5,$1,$2
While the instruction of modifying the flag bit of the emulation flag register 4 is
SETFLAG
ADD $5,$1,$2,
which indicates that the operation result of the value of No. 1 general register plus the value of No. 2 general register is not stored, but the corresponding bit of the flag bits of the emulation flag register 4 is modified according to the result.

The input set of the decoder 2 is all the possible 32-bit codes, including all legal and illegal instructions. In view of this mode, the decoder 2 is newly added with a legal input, SETFLAG, indicating that an instruction subsequent to said instruction is in the working mode of an RISC processor-based X86 virtual machine, i.e., in the working mode of emulating EFLAGS.

Based on the prefix instruction, the decoder 2 adjusts the internal operation code and sends it to the operating component according to the working mode of emulating EFLAGS when an instruction after the prefix instruction is being decoded. Here, after being decoded, the destination register of this instruction is changed into the emulation flag register 4 (M-EFLAGS), and one of the source registers is also the emulation flag register 4 (M-EFLAGS). Since some operations merely modify part of the emulation flag register 4 (M-EFLAGS), the original emulation flag register 4 (M-EFLAGS) needs to be sent to the operating components 3.

Wherein, the adjustment of the internal operation code, including the operational contents like renaming, i.e., mapping from a logical register to a physical register, and reading and writing a register port, etc., are familiar to those skilled in the art, so it is no longer described in detail in the present invention.

After decoding, the decoder 2 outputs the instruction to the operating component 3, which determines the internal operation code. If it's a normal instruction, the operation is performed in normal steps; and if it's in the working mode of emulating EFLAGS, a computed result is obtained first, and then the flag bit of the emulation flag register 4 (M-EFLAGS) is set according to the computed result and the intermediate result, wherein the computed result may not be stored in the destination register.

As another embodiment, instructions of modifying the flag bits of the emulation flag register 4 (M-EFLAGS), which are frequently used in the present invention, will correspond one to one to X86 instructions so that such an instruction is equivalent to two original instructions (a SETFLAG and a normal MIPS instruction). The following is an example:

a frequently used ADD instruction of modifying the flag bits of the emulation flag register 4 defines the instruction X86ADD, then

X86ADD $5,$1,$2 is equivalent to

SETFLAG

ADD $5,$1,$2, these frequently used instructions are allocated with individual instruction slots during decoding. After a functional component identifies these instructions, the generated result is not sent to the destination register, but a corresponding flag bits of the stimulating flag register 4 (M-EFLAGS) are generated according to the result and the flag bits are sent to the stimulating flag register 4 (M-EFLAGS).

Step S200: reading and writing values of flag bits of the emulation flag register 4 and/or performing an operation control according to the values of the flag bits of the emulation flag register 4 when the RISC processor is in the working mode of an RISC processor-based X86 virtual machine during an operation process.

In said step S200, reading and writing of values of flag bits of the emulation flag register 4 comprises the following steps:

step 210: when the RISC processor is in the working mode of X86 virtual machine, extracting the values of one or more flag bits of the emulation flag register 4, controlling the extraction of one or more bits of the emulation flag register 4 according to an 8-bit mask value therein, and storing the extracted values of the flag bits of the emulation flag register 4 in the destination register; and step 220: when the RISC processor is in the working mode of X86 virtual machine, modifying the values of one or more flag bits of the emulation flag register 4, controlling the modification of one or more bits of the emulation flag register 4 according to an 8-bit mask value therein, and modifying the emulation flag register 4 using the values in the source register.

Figure 6:
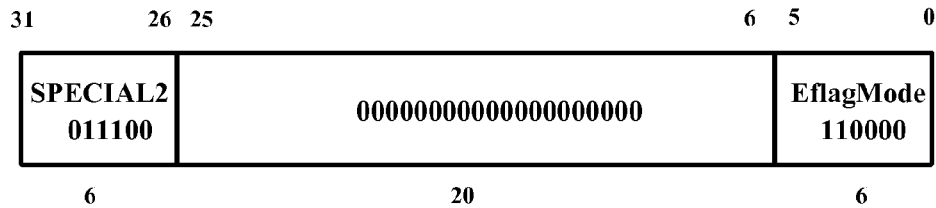
FIG. 6 is a schematic diagram showing the code of the instruction MFFLAG for reading the flag bits of the emulation flag register according to an embodiments of the present invention.

As an embodiment, the example of the present invention modifies or reads the values of the flag bits of the emulation flag register 4 via two instructions, MTFLAG and MFFLAG. The instruction codes of these two instructions are as shown in FIG. 5 and FIG. 6. They modify or read the corresponding flag bits of the emulation flag register 4 using an 8-bit mask. They respectively can write values of the flag bits of the emulation flag register 4 and read out values of the flag bits of the emulation flag register 4 to a specified general register.

The instruction MTFLAG realizes the extraction of the values of one or more flag bits of the emulation flag register 4 (M-EFLAGS), controls the extraction of the one or more flag bits of the emulation flag register 4 according to the 8-bit mask value (represented by an immediate) in the instruction, and stores the extracted values of the flag bits of the emulation flag register 4 (M-EFLAGS) in the destination register GPR [rt].

The realization of extracting the flag bits of the emulation flag register 4 using a mask is expressed by the following relation:

GPR[rt] M-EFLAGS & mask

For example, if the mask values are 0x00000100, the content of the second bit, i.e., AF bit, of the emulation flag register 4 (M-EFLAGS) will be extracted and put into the destination register GPR[rt].

The instruction MTFLAG directly modifies the values of one or more flag bits of the emulation flag register 4 (M-EFLAGS), controls the modification of one or more bits of the emulation flag register 4 (M-EFLAGS) according to an 8-bit mask value (represented by an immediate) in the instruction, and modifies the emulation flag register 4 (M-EFLAGS) using the values in the source register GPR[rs].

The realization of controlling and modifying the flag bits of the emulation flag register 4 (M-EFLAGS) using a mask is expressed by the following relation:

M-EFLAGS & mask GPR[rs]

For example, if the content of a low 8 bit of GPR[rs] is 0x00010010 and the values of the mask field are 0x00110011, this instruction will modify the CF, PF, SF and OF bits of said emulation flag register 4 (M-EFLAGS) and set the values of the four bits to 0, 1, 1 and 0, respectively.

In step S200, the operation control process comprises the following steps:

Step S210': obtaining flag bits of the emulation flag register 4 (M-EFLAGS) according to the operation result.

For example, an instruction which operates directly according to the flag bits of the emulation flag register 4 (M-EFLAGS), such as instruction X86ADD.

x86ADD/a 32-bit addition only affecting the bits of EFLAGS.

Instruction format:

X86ADD rs, rt

Instruction X86ADD realizes the addition of the 32-bit integer in register GPR [rs] and the 32-bit integer in register GPR [rt] to generate a 32-bit result. The result is not stored, but only the OF/SF/ZF/AF/PF bits of the emulation flag register 4 (M-EFLAGS) are modified according to the result.

Figure 7:
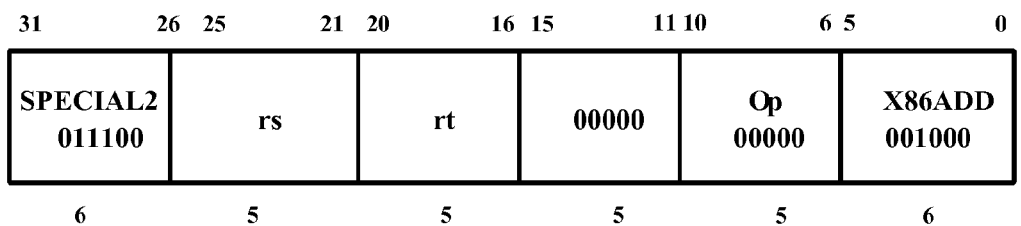
FIG. 7 is a schematic diagram showing the code of the add instruction X86ADD for modifying the flag bits of the emulation flag register according to an embodiments of the present invention.

Its code is as shown in FIG. 7.

Step S220': executing a branch jump instruction according to one or more o flag bits of the emulation flag register 4 (M-EFLAGS).

For example, X86J M-EFLAGS condition transfer

Instruction format is:

X86J.fmt offset.

Instruction X86J realizes the comparison of some bits of EFLAGS and performs a jump associated with the processor according to the corresponding condition.

Figure 8:
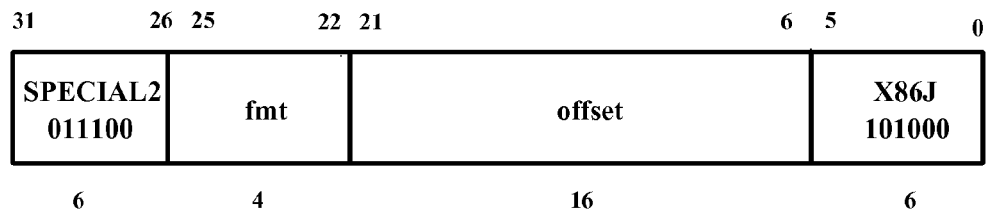
FIG. 8 is a schematic diagram showing the code of the instruction X86J M-EFLAGS for executing a branch jump according to the flag bits of the emulation flag register.

Its code is as shown in FIG. 8.

Wherein, different instruction suffixes (fmt) represent different conditions, for example, X86J.a fmt=0 indicates that it jumps when CF=0 and ZF=0.

The high 6 bits (31 bit: 26 bit) of the 32-bit instruction code of the MIPS instruction set is an opcode domain, wherein the instruction slot of SPECIAL2 (of which the opcode is 011100) can be defined independently by the user according to the provisions of MIPS. All the newly added instructions in the example of the present invention are accomplished using the values of the empty slot of SPECIAL2 reserved in the existing MIPS64 instruction sets.

The beneficial effect of the present invention is: the RISC processor and a method of precessing its register flag bit according to the present invention provide a necessary hardware support to a 6-bit flag bits of a flag register (EFLAGS) of an X86 instruction set-based CISC processor on basis of a MIPS instruction set-based RISC processor, expand the optimized space for virtual machines and achieve the purpose of improving the performance of virtual machines.

The RISC processor and a method of processing its register flag bit according to the present invention provide a necessary hardware support to EFLAG flag bits of X86 on MIPS architecture, expand the optimized space for virtual machines and achieve the purpose of improving the performance of virtual machines.

In light of the drawings illustrating the embodiments of the present invention, other aspects and features of the present invention are obvious to those skilled in the art.

The embodiments of the present invention have been described and illustrated hereinabove. These embodiments should be considered illustrative only, and cannot be used to limit the present invention. The present invention should be interpreted based on the appended claims.

INDUSTRIAL APPLICABILITY

The RISC processor and a method of processing its register flag bit according to the present invention provide a necessary hardware support to the 6-bit flag bits of the flag register (EFLAGS) of an X86 instruction set-based CISC processor on basis of a MIPS instruction set-based RISC processor, i.e., simulate to realize the flag bits of the flag register of X86 instruction set-based CISC processor using an emulation flag register. The present invention can be used to expand the optimized space for virtual machines and achieve the purpose of improving the performance of virtual machines.

The invention claimed is:

1. A reduced instruction set computing (RISC) processor, comprising:
   a physical register stack,
   an operating component connected to the physical register stack, and
   a decoder connected to the operating component,
   wherein
   the RISC processor only processes a RISC instruction set,
   the physical register stack comprises an emulation flag register for emulating flag bits of an EFLAGS register in a complex instruction set computer (CISC) processor, and in a working mode of emulating EFLAGS, values of flag bits of the emulation flag register are modified according to flag bits of an execution result which is executed by the operating component, and then the emulation flag register is decoded into a source register and/or a destination register according to different instructions, but data values of the execution result are not stored in an original destination register,
   the operating component comprises a flag read-write module for reading and writing the values of the flag bits of the emulation flag register,
   the decoder identifies that the operation is in the working mode of emulating EFLAGS when the decoder has a newly added legal input, wherein the newly added legal input is a RISC instruction, and the operating component executed an operating process and obtained the execution result according to the RISC instruction of the newly added legal input, wherein the execution result includes data values and flag bits obtained from the operating process, and
   the decoder comprises a mode identification module for identifying that a subsequent RISC instruction should be processed in the working mode of emulating EFLAGS, and then decoding the emulation flag register into the source register and/or the destination register according to different instructions.

2. The RISC processor according to claim 1, wherein the operating component further comprises an operating controller for performing an operation control according to the values of the flag bits of the emulation flag register when the RISC processor is in a working mode of an X86 virtual machine during an operation process.

3. The RISC processor according to claim 2, wherein the operation control comprises obtaining a new flag bit of the emulation flag register according to the operation result and executing a branch jump instruction according to one or more flag bits of the emulation flag register.

4. The RISC processor according to claim 3, wherein the low 6 bits of the emulation flag register represent CF bit, PF bit, AF bit, ZF bit, SF bit and OF bit, respectively, from low to high.

5. The RISC processor according to claim 2, wherein the low 6 bits of the emulation flag register represent CF bit, PF bit, AF bit, ZF bit, SF bit and OF bit, respectively, from low to high.

6. The RISC processor according to claim 1, wherein the flag read-write module comprises a flag extraction module and a flag modification module, wherein the flag extraction module is used for extracting the values of one or more flag bits of the emulation flag register, controlling the extraction of one or more bits of the emulation flag register according to an 8-bit mask value in an instruction, and storing the extracted values of the flag bits of the emulation flag register in a destination register; and the flag modification module is used for modifying the values of one or more flag bits of the emulation flag register, controlling the modification of one or more bits of the emulation flag register according to an 8-bit mask value in the instruction, and modifying the emulation flag register by using the values in the source register.

7. The RISC processor according to claim 6, wherein the low 6 bits of the emulation flag register represent CF bit, PF bit, AF bit, ZF bit, SF bit and OF bit, respectively, from low to high.

8. The RISC processor according to claim 1, wherein the low 6 bits of the emulation flag register represent CF bit, PF bit, AF bit, ZF bit, SF bit and OF bit, respectively, from low to high.

9. The RISC processor according to claim 1, wherein the low 6 bits of the emulation flag register represent CF bit, PF bit, AF bit, ZF bit, SF bit and OF bit, respectively, from low to high.

10. A method of processing flag bits of a register in a reduced instruction set computing (RISC) processor, wherein the RISC processor only processes a RISC instruction set, and comprises a physical register stack, an operating component connected to the physical register stack and a decoder connected to the operating component, the physical register stack comprising an emulation flag register for emulating flag bits of a flag register in a complex instruction set computer (CISC) processor, and the operating component comprising a flag read-write module for reading and writing the values of the flag bits of the emulation flag register, the method comprises the following steps:
   step A: setting an emulation flag register available in the RISC processor; and step B: reading and writing values of flag bits of the emulation flag register and/or performing an operation control according to the values of the flag bits of the emulation flag register when the RISC processor is in a working mode of a RISC processor-based X86 virtual machine during an operation process, and wherein the step A further comprises the following steps:

step A1: the decoder identifying that the operation is in a working mode of emulating EFLAGS when the decoder has a newly added legal input, wherein the newly added legal input is a RISC instruction; and step A2: the operating component executing an operating process and obtaining an execution result according to the newly added legal input, wherein the execution result includes data values and flag bits obtained from the operating process;

step A3: in a working mode of emulating EFLAGS, the values of the flag bits of the emulation flag register are modified according to the flag bits of the execution result which is executed by the operating component, and then the emulation flag register is decoded into a source register and/or a destination register according to different instructions, but the data values of the execution result are not stored in an original destination register.

11. The method according to claim 10, wherein the step B comprises the following steps: step B1: when the RISC processor is in the working mode of an X86 virtual machine, extracting the values of one of more flag bits of the emulation flag register, controlling the extraction of the one or more flag bits of the emulation flag register according to an 8-bit mask value therein, and storing the extracted values of the one or more flag bits of the emulation flag register in the destination register; and step B2: when the RISC processor is in the working mode of the X86 virtual machine, modifying the values of the one or more flag bits of the emulation flag register, controlling the modification of the one or more flag bits of the emulation flag register according to an 8-bit mask value therein, and modifying the emulation flag register using the values in the source register.

12. The method according to claim 10, wherein in step B, the operation control comprises the following steps: step B1': obtaining flag bits of the emulation flag register according to the operation result; and step B2': executing a branch jump instruction according to one or more flag bits of the emulation flag register.

13. The method according to claim 10, wherein the low 6 bits of the emulation flag register represent CF bit, PF bit, AF bit, ZF bit, SF bit and OF bit, respectively, from low to high.

14. The method according to claim 10, wherein the step B comprises the following steps: step B1: when the RISC processor is in the working mode of an X86 virtual machine, extracting the values of one of more flag bits of the emulation flag register, controlling the extraction of the one or more flag bits of the emulation flag register according to an 8-bit mask value therein, and storing the extracted values of the one or more flag bits of the emulation flag register in the destination register; and step B2: when the RISC processor is in the working mode of the X86 virtual machine, modifying the values of the one or more flag bits of the emulation flag register, controlling the modification of the one or more bits of the emulation flag register according to an 8-bit mask value therein, and modifying the emulation flag register using the values in the source register.

15. The method according to claim 10, wherein in step B, the operation control comprises the following steps: step B1': obtaining flag bits of the emulation flag register according to an operation result; and step B2': executing a branch jump instruction according to one or more flag bits of the emulation flag register.

16. The method according to claim 10, wherein the low 6 bits of the emulation flag register represent CF bit, PF bit, AF bit, ZF bit, SF bit and OF bit, respectively, from low to high.

* * * * *